US009218713B2

(12) United States Patent
Doan

(10) Patent No.: US 9,218,713 B2
(45) Date of Patent: Dec. 22, 2015

(54) GAMING MACHINE PERIPHERAL CONTROL METHOD

(75) Inventor: Thang Doan, Sparks, NV (US)

(73) Assignee: IGT, Las Vegas, NV (US)

( * ) Notice: Subject to any disclaimer, the term of this patent is extended or adjusted under 35 U.S.C. 154(b) by 1141 days.

(21) Appl. No.: 11/653,002

(22) Filed: Jan. 11, 2007

(65) Prior Publication Data

US 2008/0171592 A1 Jul. 17, 2008

(51) Int. Cl.
*A63F 13/00* (2014.01)
*G07F 17/32* (2006.01)

(52) U.S. Cl.
CPC .............. *G07F 17/323* (2013.01); *G07F 17/32* (2013.01); *G07F 17/3232* (2013.01); *G07F 17/3241* (2013.01)

(58) Field of Classification Search
CPC .. G07F 17/32; G07F 17/3202; G07F 17/3225
USPC .......................................... 463/29, 40, 42, 43
See application file for complete search history.

(56) References Cited

U.S. PATENT DOCUMENTS

| | | | | |
|---|---|---|---|---|
| 5,759,102 | A | 6/1998 | Pease et al. | |
| 6,135,887 | A | 10/2000 | Pease et al. | |
| 6,641,484 | B2 | 11/2003 | Oles et al. | |
| 6,979,266 | B2 | 12/2005 | Lemay et al. | |
| 7,338,372 | B2 * | 3/2008 | Morrow et al. | 463/31 |
| 2004/0254006 | A1 | 12/2004 | Lam et al. | |
| 2004/0254013 | A1 * | 12/2004 | Quraishi et al. | 463/29 |
| 2005/0159203 | A1 * | 7/2005 | Bond et al. | 463/16 |
| 2005/0181874 | A1 | 8/2005 | Bond | |
| 2006/0040745 | A1 | 2/2006 | Wells et al. | |
| 2007/0004506 | A1 | 1/2007 | Kinsley et al. | |
| 2007/0054741 | A1 * | 3/2007 | Morrow et al. | 463/42 |
| 2007/0099698 | A1 * | 5/2007 | Cole | 463/29 |
| 2007/0129151 | A1 * | 6/2007 | Crowder et al. | 463/46 |
| 2008/0082985 | A1 * | 4/2008 | Gagner et al. | 719/312 |
| 2008/0248879 | A1 * | 10/2008 | Smith | 463/42 |

FOREIGN PATENT DOCUMENTS

WO WO 2008/088655 A2 7/2008

OTHER PUBLICATIONS

International Search Report dated Dec. 11, 2008 issued in PCT/US2007/088176, 3 pp.
Written Opinion of the International Searching Authority dated Dec. 11, 2008 issued in PCT/US2007/088176, 5 pp.
International Preliminary Report on Patentability dated Jul. 14, 2009, with Written Opinion, issued in PCT/US2007/088176, 6 pp.

* cited by examiner

*Primary Examiner* — James S McClellan
(74) *Attorney, Agent, or Firm* — Neal, Gerber & Eisenberg LLP

(57) ABSTRACT

A request for authorization for use of one or more peripheral devices of a wager gaming machine may be transmitted to another device (e.g., a central server) via a network. The request may, for example, include a machine-specific identifier and a peripheral identifier. The request may be sent from the wager gaming machine or from another device. The request may be sent automatically in response to certain conditions, e.g., when a peripheral device has been replaced and/or when the wager gaming machine initializes. The central server may determine (inter alia) whether the peripheral is approved for use in the registered jurisdiction and then send the appropriate authorization (or denial). Software (e.g., driver software) may accompany an authorization.

36 Claims, 8 Drawing Sheets

200

| Device Type 205 | Device ID 210 | Device Code 215 | Games/Jurisdiction 220 | Auth ? 225 |
|---|---|---|---|---|
| Touch Screen 1 | HZ3R75 | Y | 3X, 23, R1, 53, I7, 29/NV | N |
| Touch Screen 2 | UC884N9 | Y | 3X, 23, 51, 53, I6/CA | N |
| Touch Screen 3 | QK5JIW | Y | 3X, 22, R2, 53, I7, 28/NJ | N |
| Touch Screen 4 | 50PX2RT | Y | 3X, 23, R1, I7, 29/NV | Y |
| Touch Screen 5 | F83KEB | Y | 3Y, 24, R2, 53, I7, 30/MS | N |
| Touch Screen 6 | CV229A4 | Y | 3X, 23, R1, 53, I7, 29/NV | N |
| Touch Screen 7 | 52RS1YX | Y | 3Z, 23, R1, 53, I7, 29/NY | N |
| Touch Screen 8 | N/A | N/A | N/A | N/A |
| Touch Screen 9 | N/A | N/A | N/A | N/A |
| Touch Screen 10 | N/A | N/A | N/A | N/A |
| Bill Validator 1 | PRO997 | Y | 3X, 23, R1, 53, I7, 29/NV | Y |
| Bill Validator 2 | F93JJE4 | Y | 3X, 24, R1, 53, I7, 30/CA | N |
| Bill Validator 3 | 4SP04N | Y | 3Y, 23, R2, 54, I7, 29/NV | N |
| Bill Validator 4 | N/A | N/A | N/A | N/A |
| Bill Validator 5 | N/A | N/A | N/A | N/A |
| Bill Validator 6 | N/A | N/A | N/A | N/A |
| Bill Validator 7 | N/A | N/A | N/A | N/A |
| Bill Validator 8 | N/A | N/A | N/A | N/A |
| Bill Validator 9 | N/A | N/A | N/A | N/A |
| Bill Validator 10 | N/A | N/A | N/A | N/A |
| Monitor 1 | TI77V3 | Y | 3X, 23, R1, 53, I7, 29/NV | N |
| Monitor 2 | XP004HN | Y | 3X, 23, R2, 53/CA | N |
| Monitor 3 | 2Y4SS8 | Y | 3X, 23, R1, 53, 29/NV | Y |
| Monitor 4 | 35JE6V | Y | 3Y, 23, R2, 53, I7, 29/NV | N |

*FIG. 2*

GAMING MACHINE PERIPHERAL CONTROL METHOD

FIELD OF THE INVENTION

The present invention relates to peripheral devices of electronic gaming machines for providing games of chance.

BACKGROUND OF THE INVENTION

In computing environments it is common to associate one or more peripheral devices with a central controller or processor. As one example, electronic gaming machines may include a plurality of peripheral devices, such as a bill validator, a coin acceptor, a ticket dispenser, a video display, and a variety of other devices. These peripheral devices are associated with, and controlled partly by, one or more gaming control units.

Generally, each peripheral also has its own internal controller. This controller may comprise a processor arranged to execute control code, or hardware embodying the control code. The code, whether in the form of executable software or embodied in hardware, controls certain aspects of the operation of the peripheral device. In the example of a gaming machine, the gaming control unit may accept signals from and transmit signals to a bill validator peripheral. The transmitted signals may include control signals such as a signal instructing the bill validator to shut off or cease operation in the event the gaming device security is compromised. The bill validator may include specific code governing the bill validation process, such as code arranged to compare scanned bill image data to a particular set of fixed bill validation data.

In many instances, it is desirable to replace a peripheral device and/or modify the executable code associated with a peripheral. For example, it may be advantageous to upgrade a peripheral device that includes new features, provides a more satisfactory game presentation, etc. It may be that the price has increased to an unacceptable level, the peripheral vendor/supplier cannot supply enough of them, the peripheral performance is inadequate, the vendor no longer makes the peripheral, or simply that an upgrade is desired.

However, updating a peripheral device and/or peripheral code generally means that a new round of expensive and time-consuming regulatory approvals are required. Every time a peripheral device is changed, an approval must be obtained from each jurisdiction in which the newly-configured gaming machine will be deployed. A gaming machine manufacturer may also need to change the relevant peripheral code, e.g., device drivers, and possibly the game code, to accommodate the new peripheral. That means that the game code for multiple games may also need to be re-submitted for approval.

It would be desirable to provide new methods and devices that overcome at least some shortcomings of the prior art.

SUMMARY OF THE INVENTION

A request for authorization for use of one or more peripheral devices of a wager gaming machine may be transmitted to another device (e.g., a central server) via a network. The request may, for example, include a machine-specific identifier and a peripheral identifier. The request may be sent from the wager gaming machine or from another device. The request may be sent automatically in response to certain conditions, e.g., when a peripheral device has been replaced and/or when the wager gaming machine initializes. The central server may determine (inter alia) whether the peripheral is approved for use in the registered jurisdiction and then send the appropriate authorization (or denial). Software (e.g., driver software) may accompany an authorization.

In some implementations of the invention, the fixed table of peripherals that is currently hard-coded into gaming machines is replaced with a larger table that has slots for a large number of devices. This larger table may indicate peripherals that are approved for use in one or more jurisdictions. In some implementations of the invention, a gaming machine will only send authorization requests for peripheral devices referenced in the table.

Some embodiments of the invention provide a wager gaming machine that includes a network interface and a plurality of interfaces for communication with peripheral devices. The gaming machine also includes at least one processor configured to do the following: send wager gaming machine identification data and peripheral device data for a wager gaming machine to a device via the network interface; receive a response from the device; and determine whether to enable operation of the wager gaming machine according to the response. The device may be, for example, a central server.

The processor may be configured to perform the sending step after receiving an indication that a new peripheral device has been configured for communication with the wager gaming machine and/or after the wager gaming machine has performed, at least in part, an initialization process. The processor may be configured to perform the sending step after ascertaining that no previous response has been received authorizing the operation of at least one peripheral device currently configured for communication with the wager gaming machine.

The gaming machine may be further configured to send location data to the device. The peripheral device data may indicate at least one peripheral device that is currently configured for communication with the wager gaming machine. The peripheral device data may comprise at least one of a peripheral device model number and a peripheral device serial number. The peripheral device data may indicate all peripheral devices that are currently configured for communication with the wager gaming machine. The peripheral device data may comprise data regarding a new peripheral device.

The wager gaming machine may include a memory having a data structure stored therein, the data structure indicating peripheral devices approved for use with the wager gaming machine in at least one jurisdiction. A processor may be configured to determine at least some of the peripheral device data with reference to in the memory and/or by polling peripheral devices currently configured for communication with the wager gaming machine. The data structure may indicate at least one peripheral device that is not currently configured for communication with the wager gaming machine. A processor may be configured to update the data structure when the response indicates an approval of a peripheral device.

A response indicating an approval of the new peripheral device may include software for use with the new peripheral device. The software may comprise driver software.

Some implementations of the invention provide a method that includes these steps: sending wager gaming machine identification data and peripheral device data for a wager gaming machine to a central server; receiving a response from the central server; and determining whether to enable operation of the wager gaming machine according to the response.

The peripheral device data may indicate peripheral devices currently configured for communication with the wager gaming machine. The peripheral device data may comprise at least one of a peripheral device model number and a peripheral device serial number.

The sending step may comprise sending location data to the central server. The sending step may be performed after receiving an indication that a new peripheral device has been configured for communication with the wager gaming machine and/or after the wager gaming machine has performed, at least in part, an initialization process. The sending step may be performed after ascertaining that no previous response has been received authorizing the operation of at least one peripheral device currently configured for communication with the wager gaming machine.

The method may involve determining at least some of the peripheral device data from a database of approved peripheral devices that are approved for use with the wager gaming machine in at least one jurisdiction. The approved peripheral devices may comprise authorized peripheral devices that are currently authorized for use and unauthorized peripheral devices that are not currently authorized for use. Alternatively, or additionally, the method may involve determining at least some of the peripheral device data from a peripheral device configured for communication with the wager gaming machine.

The sending step may comprise sending data from the wager gaming machine to the central server, sending data from a network device to the central server and/or sending data from a host device to the central server. The network device may be, e.g., a bank switch or another device in a gaming establishment.

Alternative embodiments of the invention provide a wager gaming machine, comprising: a plurality of peripheral interfaces for communication with peripheral devices; a network interface; and a memory having a data structure stored therein, the data structure indicating peripheral devices approved for use with the wager gaming machine in at least one jurisdiction. The wager gaming machine includes at least one processor configured to do the following: identify a peripheral device in communication with a peripheral interface; ascertain whether the peripheral device is indicated in the data structure; and determine whether to send an authorization request via the network interface according to whether the peripheral device is indicated in the data structure.

A processor may be further configured to send the authorization request to a device via the network interface when the peripheral device is indicated in the data structure. A processor may be configured to prevent wager gaming on the wager gaming machine when the peripheral device is indicated in the data structure.

At least one processor may be further configured to do the following: determine a jurisdiction of the wager gaming machine; determine, by reference to the data structure, whether the peripheral device is authorized for use with the wager gaming machine in the jurisdiction; and send the authorization request only when it is determined that the peripheral device is authorized for use with the wager gaming machine in the jurisdiction. Moreover, a processor may be configured to receive a response from the device; and determine whether to enable operation of the wager gaming machine according to the response.

Some embodiments of the invention provide a server, comprising at least one network interface and at least one processor configured to do the following: receive wager gaming machine identification data and peripheral device data via a network interface; determine a jurisdiction in which a wager gaming machine is located; evaluate whether peripheral devices of the wager gaming machine are approved for the jurisdiction; and send a response via a network interface indicating whether to authorize operation of the wager gaming machine.

The determining step may involve searching a database that indicates jurisdictions and peripheral devices approved in the jurisdictions. The peripheral device data may comprise at least one of a peripheral device serial number and a peripheral device model number. A processor may be configured to ascertain whether the gaming machine identification data correspond with the peripheral device data.

The response may include software when the response authorizes operation of the wager gaming machine. The software may comprise, e.g., peripheral device software.

A processor may be configured to send a notification when the response does not authorize operation of the wager gaming machine. The notification may include an indication of at least one peripheral device not approved for the jurisdiction. The notification may comprise at least one of a peripheral device serial number and a peripheral device model number.

At least one processor may be configured to determine whether the wager gaming machine has been moved. A process of evaluating whether peripheral devices of the wager gaming machine are approved for the jurisdiction may depend on a determination of whether the wager gaming machine has been moved.

Another method of the invention includes these steps: receiving wager gaming machine identification data and peripheral device data; determining a jurisdiction in which a wager gaming machine is located; evaluating whether peripheral devices of the wager gaming machine are approved for the jurisdiction; and sending a response indicating whether to authorize operation of the wager gaming machine. The peripheral device data may comprise at least one of a peripheral device serial number and a peripheral device model number. The determining step may comprise searching a database that indicates jurisdictions and peripheral devices approved in the jurisdictions.

The response may comprise software when the response authorizes operation of the wager gaming machine. The software may comprise peripheral device software. The method may involve sending a notification when the response does not authorize operation of the wager gaming machine. The method may comprise updating a database to indicate whether operation of the wager gaming machine was authorized.

The method may also involve determining whether the wager gaming machine has been moved. A process of determining whether to authorize operation of the wager gaming machine may depend, at least in part, on whether the wager gaming machine has been moved.

The methods of the present invention may be implemented, at least in part, by hardware and/or software. For example, some embodiments of the invention provide computer programs embodied in machine-readable media. The computer programs include instructions for controlling one or more devices to perform the methods described herein.

BRIEF DESCRIPTION OF THE DRAWINGS

FIG. 2 is a table that illustrates a portion of a data structure in accordance with some aspects of the invention.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
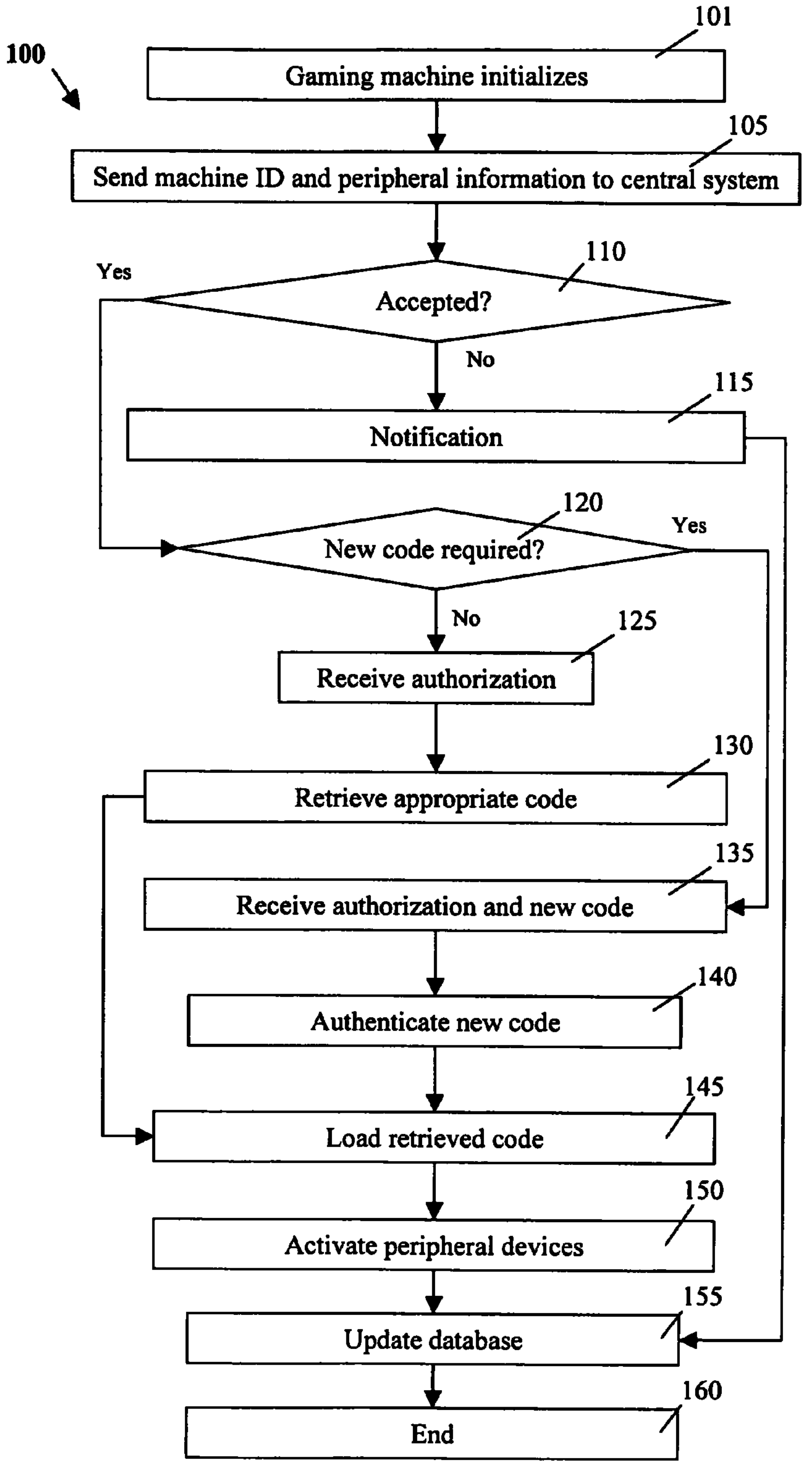
FIG. 1 is a flow diagram illustrating a method according to one implementation of the invention.

Some implementations of the invention will now be discussed with reference to FIG. 1. The steps of method 100, as with other methods of the invention, are not necessarily performed in the order indicated. In addition, there may be more (or fewer) steps performed than are indicated.

In this example, method 100 begins when a wager gaming machine initializes (step 101), at least in part. Method 100 may or may not be performed each time a wager gaming machine initializes. For example, the process (or a similar process) may be initiated when predetermined conditions are detected and/or a predetermined length of time has elapsed. The conditions may involve the installation of one or more new peripheral devices, the deployment of the gaming machine, movement of the machine, opening the machine, etc. For example, the process could be initiated whenever a new peripheral device is connected to, or otherwise configured for communication with, a gaming machine.

In this example, a gaming machine performs part or all of its initialization process and then sends gaming machine identification information and peripheral information to a central system, e.g., to one or more devices of a wager gaming machine provider such as IGT. (Step 105.) However, other devices may be involved in the process of sending and/or receiving such data. For example, a local network device (e.g., a bank switch or a local server), a host device (e.g., a portable host device such as a laptop or a PDA) under the control of an operator, etc., may facilitate this process and/or act as an intermediary.

Location information may also be included with the gaming machine identification information and peripheral information. In some such implementations, a gaming machine will include a location detection device, such as a Global Positioning System device, and data from the location detection device will be included. In other implementations, another device (e.g., a bank switch or another device in the gaming establishment) will provide location information.

However, the location of a gaming machine may be determined even if such location information is not expressly indicated. In some implementations, the location will be determined (at least in part) by reference to a database of land telephone lines, modems, etc., and corresponding addresses. The location may be verified by reference to a location determined by other methods, e.g., by use of a “traceroute” or similar program to determine the location of an Internet service provider’s network device that is near an operator’s host device, a gaming machine, etc.

The process of location determination may be performed according to varying levels of stringency. For example, in some instances the location determination may involve only a mapping of a gaming machine serial number (and/or the MAC address of a gaming machine network card) in a request to a gaming machine location in a database. In other examples, the location determination may involve more reliable and/or multiple processes, which may include but are not limited to those discussed above.

In this example, the gaming machine itself sends the information referenced in step 105, e.g., via a network interface. In some such implementations, the process happens automatically. Such implementations can be advantageous because an operator does not need to take any special action in order to initiate the process, other than actions that would generally be necessary to put a gaming machine into service (e.g., hooking it up, plugging it in and turning it on). The operator may not even be aware that the process is happening. Such lack of awareness has many potential benefits, including operator convenience and a decreased likelihood that the operator (or another individual) would seek to thwart and/or circumvent a peripheral authorization process.

In step 110, a determination is made as to whether peripherals indicated by the peripheral information should be authorized for use on the indicated gaming machine. The determination may be made by any convenient device that is configured according to some aspects of the invention. For example, a server, a host device, etc., of a central system may make the determination by executing software written to implement methods of the invention. More than one device may be involved in step 110. For example, a server, a host device, etc., may access one or more storage devices wherein relevant data structures are stored. Some such devices are described below with reference to FIGS. 5 and 6. The data structures may include jurisdictional data, wager gaming machine data, peripheral device data, etc.

According to some such implementations, step 110 involves referencing a jurisdiction specific authorization database. A device, e.g. in a central system, may evaluate whether to approve the use of one or more peripheral devices by reference to such a database. The database may contain a list of peripheral devices approved for each jurisdiction with the corresponding wager gaming machine platform.

Such implementations represent a significant change from prior art methods, which were manual and time-consuming. For example, when IGT has developed a particular monitor with a touch screen, a gaming machine would be built and submitted for regulatory approval with that monitor. The gaming machine, including the peripherals, would be logged on paper and kept in a file. There was no central repository where one could determine, e.g., whether that particular monitor had been approved in multiple jurisdictions. There was no database that a person could search to determine the jurisdictions in which a particular peripheral device was approved. Instead, the process would take several weeks and involve a lot of telephone calls to administrators of various jurisdictions.

The determination of step 110 is preferably made with reference to a particular wager gaming machine, to allow tracking gaming machine’s whereabouts, updating data structures to indicate approved and deployed peripheral devices, etc. Therefore, the gaming machine identification information preferably identifies the individual gaming machine involved. Identifying the gaming machine provides the central system an opportunity to evaluate more fully whether to authorize the wager gaming machine to function. The central system could determine not only what peripheral devices are approved for use in the relevant jurisdiction, but also what peripheral devices have previously been associated with the wager gaming machine, whether the gaming machine has been moved to another location, etc. In some implementations of the invention, a higher level of scrutiny will be applied when certain criteria are met (or not met), e.g., when one of these factors has changed. Such processes will be described in more detail below with reference to FIG. 4.

Some implementations of the invention apply device fingerprinting techniques for device identification and/or verification. Some such fingerprinting techniques involve the exploitation of small deviations in processor clock skews. Such methods can uniquely identify an individual device, not merely a class, make or model of device. Relevant techniques are discussed, for example, in Kohno, Tadayoshi, "Remote Physical Device Fingerprinting" (IEEE Symposium on Security and Privacy [May 2005]), which is hereby incorporated by reference for all purposes. Such techniques may be used to identify uniquely a gaming machine and associated peripheral device(s). Moreover, such techniques may be used to verify the accuracy of gaming machine and/or peripheral device identification information.

When a new peripheral device is not approved, there is preferably some level of notification (step 115), e.g., to the casino operator, to the gaming machine provider, to a regulatory agency, etc. Preferably, a record pertaining to the gaming machine is updated with the notification information, including the reasons for lack of approval, the peripheral devices currently configured for use with the gaming machine, etc. A warning message may be sent to operators of a central system, to the gaming establishment and/or to a regulatory body. In some implementations, the notification will provide information regarding the type of device that was not authorized, in order to allow a more focused assessment of the situation. For example, the notification may indicate that the device type and possibly the individual serial number of the unapproved peripheral and gaming machine. For notifications to locations other than that of the gaming establishment in which the gaming machine is located, the notification should include an indication of that gaming establishment.

In this example, when the peripheral device(s) are approved in step 110, a determination is made as to whether some type of software is required for use with the new peripheral(s). (Step 120.) In some instances, the gaming machine may have stored or locally available code that is adequate. Therefore, in some such implementations, no new code will be required and only an authorization will be sent to the gaming machine. (Step 125.) The gaming machine will retrieve (step 130) and load (step 145) the appropriate code, if it has not done so already.

For example, in some instances when a new peripheral device is added to a gaming machine, peripheral and/or game code associated with the new peripheral device may be locally provided to the gaming machine, e.g., via a storage medium such as an optical disc. Such code may be referenced, for example, in a data structure similar to that illustrated in table 200 of FIG. 2, which is described below. The version(s) of the code may be checked and a determination may be made in step 120 as to whether a more recent version of the code is available.

However, in some implementations, peripheral and/or game code will be provided (e.g., downloaded from a central system) even if the gaming machine has locally available code. For example, if the gaming machine is in communication with a server-based gaming network, in some implementations the most recent version of peripheral and/or game code may be downloaded from a central server whether or not the gaming machine has locally stored peripheral and/or game code. (Step 135.) Preferably, the new code is authenticated (step 140) before loading and use, either by the gaming machine or by another device. Code that fails such an authentication process should be rejected, though this is not expressly indicated in FIG. 1.

Some implementations of the invention may be used in connection with emulation, memory address mapping and other methods, e.g., in order to facilitate the use of new peripherals with a gaming machine, the use of legacy game code with a new peripheral, upgrades/changes in interfaces and corresponding protocols, etc. Relevant methods and devices are described in U.S. patent application Ser. No. 11/225,406, entitled "Emulation in a Secure Regulated Environment" and filed on Sep. 12, 2005, which is hereby incorporated by reference for all purposes.

After receiving authorization, the gaming machine is permitted to activate the peripheral devices and present wagering games. (Step 150.) Preferably, one or more databases are updated to indicate the new status of the gaming machine. (Step 155.) For example, it is preferable that a central database be updated to indicate the current status and configuration of the gaming machine. A local database may also be updated, e.g., as described below with reference to FIG. 2.

Previously, when a gaming machine was deployed, it included a data structure indicating a hard-coded list of peripherals. Similarly, the gaming code provided to a gaming machine would have a gaming driver for each of the peripherals indicated in the hard-coded data structure. For example, if the peripheral device were a 3M™ touch screen, a corresponding vendor ID would be expected. If the USB protocol were used for internal communications, the vendor ID for that peripheral device would be in the appropriate field according to the USB protocol. The game code would "ping" the peripheral and verify, from the USB vendor ID field of the response, that the peripheral is a 3M™ touch screen.

Some implementations of the present invention provide alternative methods and devices. In some such implementations, the gaming machine itself (or another local device) includes a database or other data structure that may be updated to indicate, e.g., whether a peripheral device has been authorized. In some such implementations, when a gaming machine provider has deployed an approved machine, a record is made regarding the gaming machine and the associated peripherals. The machine may be logged according to its model number, serial number, etc., and those of the deployed peripherals. One or more central databases, as well as a local database (e.g., stored within the gaming machine itself or another local device), may be updated accordingly.

According to some such implementations, gaming machines are provided with a data structure having "slots" or fields for number of pre-approved peripheral devices. Multiple peripheral devices may be indicated, even for a particular jurisdiction. The table would preferably indicate multiple device IDs for each peripheral type, indicating the pre-approved peripheral devices in each category of peripheral types. All of the various peripheral types approved for the gaming machine may be indicated in the data structure.

If a peripheral device were installed that is not on the list, the device would not be found in the database. This fact may be reported, e.g., to a server or host device of a central system (e.g., a central system controlled by the gaming machine provider), to a casino operator, possibly to regulatory authorities. Preferably, the message would include information regarding the new peripheral device. Someone from the central system may follow up with a communication to the casino, e.g., via email or telephone, e.g., "The monitor for that gaming machine is not IGT approved. Please replace the monitor with a monitor that is approved for this jurisdiction."

Accordingly, even if there is a local database of approved peripheral devices, there is preferably still an authentication/authorization process involving a central system, e.g., via a data link to central servers and database(s). The process may be similar to that of method 100. The data sent in step 105, however, may include not only an identification of the peripheral devices, but also an indication of whether the peripheral devices have been approved and, if so, in what jurisdiction(s). In some instances, the gaming machine may not initiate an approval process unless it determines (e.g., by reference to its local data structure) that certain criteria have been met (or not). For example, the gaming machine may determine that one or more peripheral devices have been changed, are not listed as approved devices, etc.

However, in preferred implementations, the gaming machine will need an authorization from a central system even if there is no indication in a local database that anything is awry. For example, the gaming machine may have been configured in Nevada and all of its peripherals may have been approved for the State of Nevada. The gaming machine's local data structure may indicate that all of its peripheral devices have been approved for use in that jurisdiction. However, the gaming machine may be moved to a different jurisdiction, e.g., to Montana. When it initializes, the gaming machine may not be "aware" of its location and may indicate (e.g., via data transmitted to a central system) that all the peripheral devices have been approved for use in its jurisdiction. The central system preferably makes an independent determination as to the gaming machine's location and whether the peripheral devices are approved for that jurisdiction.

The combination of a locally-stored list of pre-approved peripheral devices with an approval process involving a central database of gaming machines, approved peripheral devices in various jurisdictions, etc., has many potential advantages: For example, this combination allows a much greater range of supply capabilities for the gaming machine provider, while allowing greater control for the gaming machine provider over what peripherals are used on its machines. Such methods and devices can also help to ensure compliance with jurisdictional requirements.

An example of one such local data structure will now be described with reference to FIG. 2. FIG. 2 shows a portion of data structure 200, which is depicted in the format of a table in this example. Device type field 205 indicates the peripheral device type. In this example, touch screens, bill validators and some monitor entries are indicated in table 200. Seven approved touch screens, 3 approved bill validators and 3 approved monitors are indicated. Additional monitor entries and other device types are included in the table, but are not illustrated in FIG. 2. Here, there are fixed numbers of entries available for each device type. For example, there are 3 unassigned entries available for touch screens and 7 unassigned entries available for bill validators.

In this example, there is a predetermined number of "slots" or fields for each kind of device, in this case 10 slots for each type of peripheral device. That way, after the database is created, approved peripherals of a particular type will be in a certain range of the database. For example, the touch screens would be in slots 0 through 9, etc. There are advantages to such implementations, in that a device that queries the data structure (e.g., a gaming machine) knows in advance where to look for a particular type of peripheral device.

However, not all implementations of the invention provide the same number of slots for each peripheral device type. Instead, some implementations of the invention provide a different number of fields for different peripheral devices, e.g., 8 for some and 12 for others. Some implementations of the invention provide a variable number of peripheral device types.

Moreover, some implementations of the invention allow a dynamic allocation of peripheral device slots, e.g., up to the limits of a corresponding memory allocation. For example, if a memory has enough space for 100 slots/fields, some such implementations will allocate any convenient number of slots to a particular peripheral device type. Some such implementations provide some form of feedback, e.g., "You now have 10 fields allocated for touch screens. This leaves only X fields for all remaining peripheral devices."

To facilitate the development and approval of multiple peripheral devices, the gaming machine manufacturer may provide predefined information, which may include codes and/or protocols, to various peripheral providers. The peripheral providers may be instructed to provide firmware, etc., to drive the peripherals according to the predefined information.

For example, IGT may instruct multiple touch screen providers to design their touch screen controller and sensor according to an IGT-specified protocol. It would not matter what entity provides the touch screens; Vendors A, B, C and D would build the touch screen in essentially the same way, according to IGT's design and protocol.

Device ID field 210 indicates the device ID of each approved device. The device ID may be indicated in any convenient fashion, e.g., as a USB device ID. The following applications describe relevant subject matter and are hereby incorporated by reference: U.S. patent application Ser. No. 10/460,822, filed on Jun. 11, 2003 and entitled "USB SOFTWARE ARCHITECTURE IN A GAMING MACHINE," which claims priority under U.S.C. 120 from U.S. patent application Ser. No. 10/246,367, filed on Sep. 16, 2002, and entitled, "USB DEVICE PROTOCOL FOR A GAMING MACHINE," which is a continuation-in-part from U.S. patent application Ser. No. 10/214,255, filed on Aug. 6, 2002, titled "STANDARD PERIPHERAL COMMUNICATION", which is a continuation of U.S. patent application Ser. No. 09/635,987, titled "STANDARD PERIPHERAL COMMUNICATION" filed on Aug. 9, 2000, which is a divisional application from U.S. patent application Ser. No. 09/414,659, titled "STANDARD PERIPHERAL COMMUNICATION" filed on Oct. 6, 1999, which is now U.S. Pat. No. 6,251,014.

However, the invention does not necessarily involve use of the USB protocol. In addition to (or instead of) the USB protocol, one could use FireWire, NetPlex, RS232, or any convenient communication protocol.

In some implementations of the invention, device ID field 210 can uniquely identify the specific instance of a peripheral device. In such implementations, device ID field 210 indicates not only a peripheral device manufacturer and/or model, but also a specific "serial number" of a make and model. In some preferred implementations, when a peripheral device is replaced with another peripheral device of an approved make and model, the new peripheral device must still be authorized by a central and/or a local system, databases updated, etc. Such methods help to ensure that only approved devices are installed on the gaming machine instead of, for example, "black market" devices or other unapproved devices that may be configured to perform the functions of the peripheral device.

Device code field 215 indicates whether device code (such as a device driver software) is available locally for the corresponding peripheral device. In some implementations, device code field 215 may include a pointer to a memory location where the device code is stored.

Games field 220 indicates the games that are approved for play with the corresponding peripheral device in a given jurisdiction. In some implementations, there are multiple fields 220 (e.g., 220*a*, 220*b*, etc.) and corresponding to games approved in multiple corresponding jurisdictions. The corresponding jurisdiction(s) may be indicated in one or more separate fields.

Game code is generally peripheral-specific, at least to some degree. As the peripheral devices of a gaming machine are replaced, it will often be the case that the new peripherals use a different protocol, have different functionality, etc., than the peripherals for which the game code was written. In some instances, modified versions of the game code may need to be created and approved by the relevant gaming regulatory body or bodies. Such modified versions of the game code may, for example, be stored locally or may be downloaded when needed, according to the implementation.

In this example, field 225 indicates whether the peripheral device is currently authorized for use with the gaming machine. Field 225 may be updated, for example, after a gaming machine receives approval from a central system (e.g., according to method 100 or other methods described herein). In this example, touch screen 4, bill validator 1 and monitor 3 are currently authorized for use.

In some implementations of the invention, a gaming machine (or other local device) will not allow a gaming machine to operate when a local data structure indicates that a peripheral device configured for communication with the gaming machine is not approved in a particular jurisdiction. In some such implementations, the gaming machine (or other local device) will not allow an approval request to be transmitted to a central system.

Figure 3:
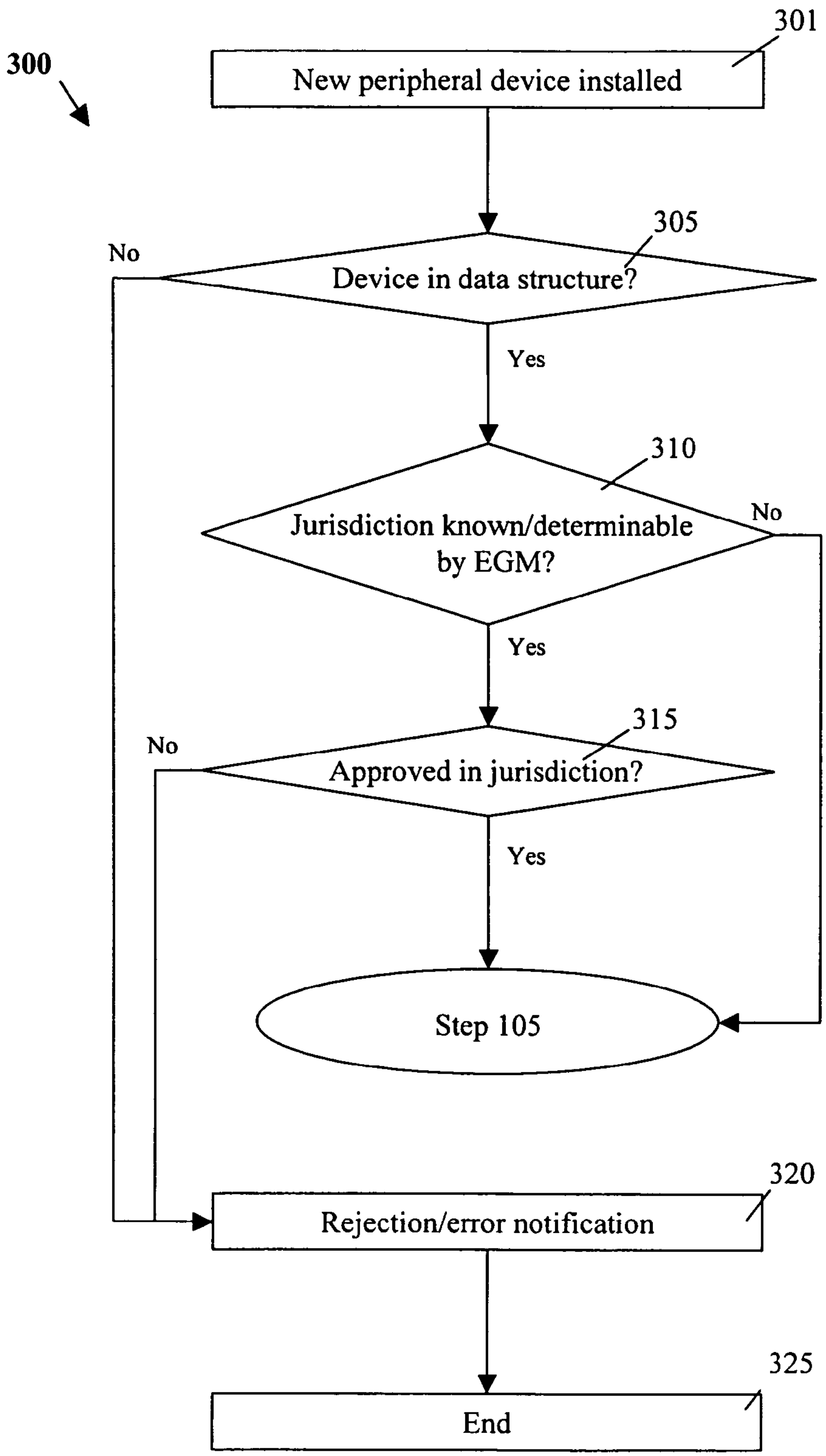
FIGS. 3 and 4 are flow diagrams outlining the steps of some methods of the invention.

One such method 300 will now be described with reference to FIG. 3. In step 301 a new peripheral device is configured for communication with a gaming machine. Here, the new peripheral device is installed by attaching it directly to the gaming machine. In step 305, a logic device (e.g., a processor) of the gaming machine queries a local data structure of approved peripheral devices to determine whether the new peripheral device is approved in any jurisdiction. If not, an error notification is made (step 320) and the process ends. (Step 325.) The error notification may be made, e.g., in a manner similar to that described above with reference to step 115.

If the new peripheral device is indicated in the local data structure of approved peripheral devices, the process continues to step 310. At this stage, it is determined whether the gaming machine's jurisdiction can be locally determined in a satisfactory fashion. For example, the gaming machine or a trusted local device may have location detection capability and the intelligence to transform location data into jurisdictional data.

In this example, the local location/jurisdictional determination is used not as a method of approving the new peripheral device, but only to prevent the use of unauthorized peripheral devices. Therefore, if the jurisdiction is locally known and the local device determines that the new peripheral device is approved in the jurisdiction, then authorization of a central system is sought. In this example, the approval/authorization process is that of method 100, so the process continues to step 105. Otherwise, the new peripheral device is rejected. (Step 320.)

In alternative implementations, the gaming machine or another local device may be used to authorize use of the gaming machine with the new peripheral device. However, such implementations are not preferred because of the lack of control by a central system and the consequent greater likelihood unauthorized peripheral devices may be used.

Figure 4:
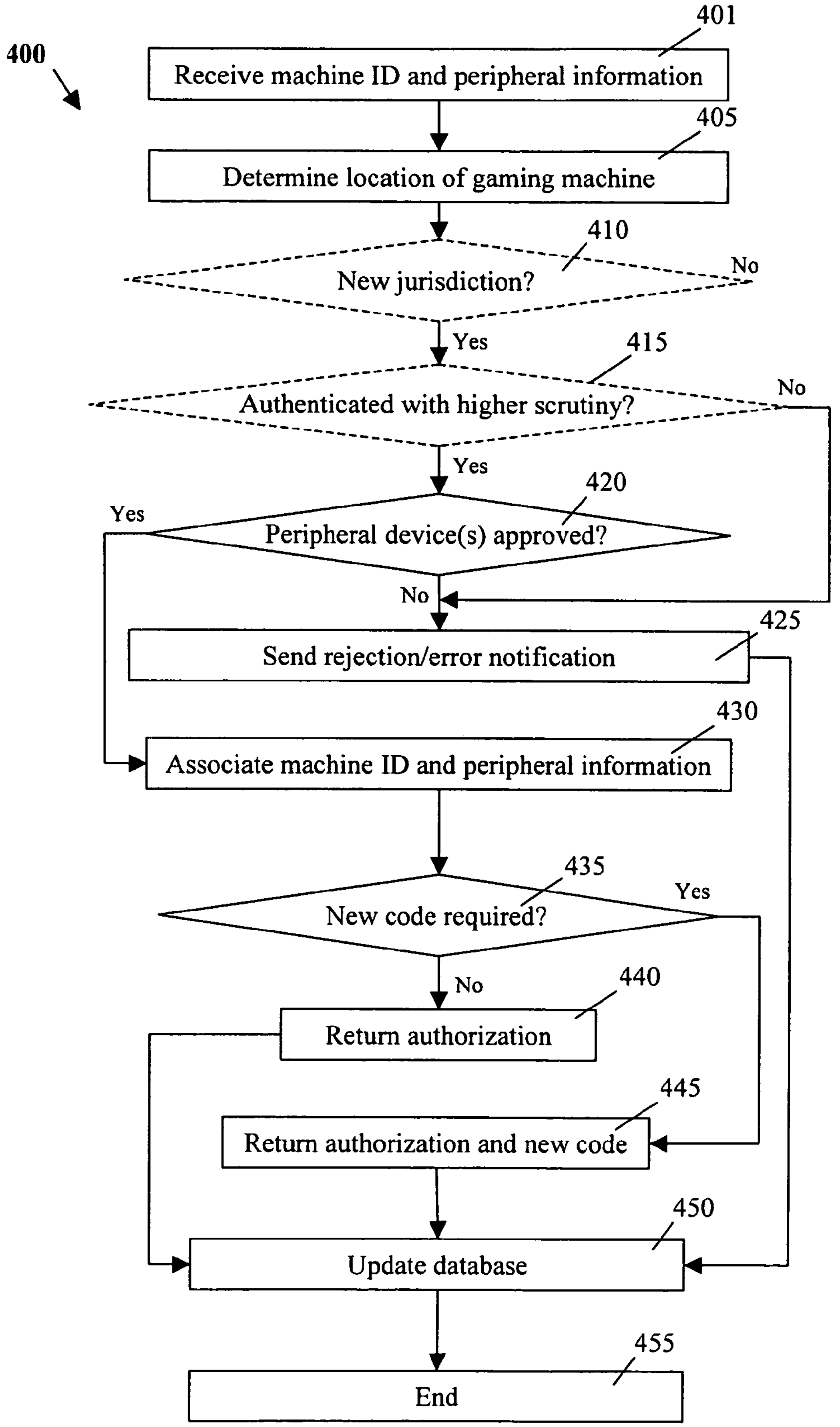

An alternative method 400 of the invention will now be described with reference to FIG. 4. Method 400 is presented mainly from the perspective of a central system or other authority that is determining whether to authorize peripheral devices. Accordingly, in step 401, the central system receives wager gaming machine identification data and peripheral data. These data may be substantially as described elsewhere herein or may differ in the particulars. These data may or may not include location information. However, whether or not these data include explicit location data, the location and jurisdiction of the gaming machine are determined. (Step 405.)

Some implementations of the invention provide varying levels of security/authentication, depending on one or more predetermined indicia. These indicia may be associated with some type of change that has occurred, the passage of a predetermined length of time, the approval (or rejection) of a predetermined number of peripheral devices associated with gaming machines of a particular gaming establishment, etc.

In some such implementations, the central server will determine whether the gaming machine is where it is supposed to be, e.g., whether the gaming machine has been moved to a location different from that indicated in a central database of deployed gaming machines. (Optional step 410.) If so, the central server (or another device) may apply a higher level of scrutiny to the request, e.g., by implementing a more stringent authentication and/or authorization process. (Optional step 415.)

For example, if the request is made with respect to a single new peripheral device, the central server may also request information regarding all peripherals of the gaming machine. The central server may also apply more stringent authentication and/or encryption methods. The central server may also require operator involvement at the central system and/or gaming establishment, etc.

If operator involvement is required, the operator should be identified. Any type of personal identification methods and devices known in the art may be used to identify an operator. Data used in an initial registration process are preferably stored for subsequent use. For example, the operator may be asked to use biometric device such as retinal scanner, a fingerprint reader, etc., and to transmit the data obtained from the biometric device to a central location. The operator may be asked to input a confirmation number, swipe a card, and/or use a special dongle having an encrypted password, a key, etc. The operator may be asked to make an oral response during a telephone call to a telephone number associated with the operator's location. The oral response may be analyzed, e.g., according to known voice biometrics of a user obtained during a registration process, to verify the operator's identity.

In this example, a higher-level authentication process is performed in step 415 if one or more predetermined indicia are present (or not present). If the higher-level authentication process is not concluded satisfactorily, a rejection/error notification is sent. (Step 425.) If the higher-level authentication process is concluded satisfactorily, the peripheral device(s) may be evaluated substantially as in method 100. (Step 420.) Either way, one or more central databases should be updated to indicate the results of the process. (Step 450.) The remaining steps of method 400 parallel those of method 100. To avoid repetition, these steps will not be described here in further detail.

Figure 5:
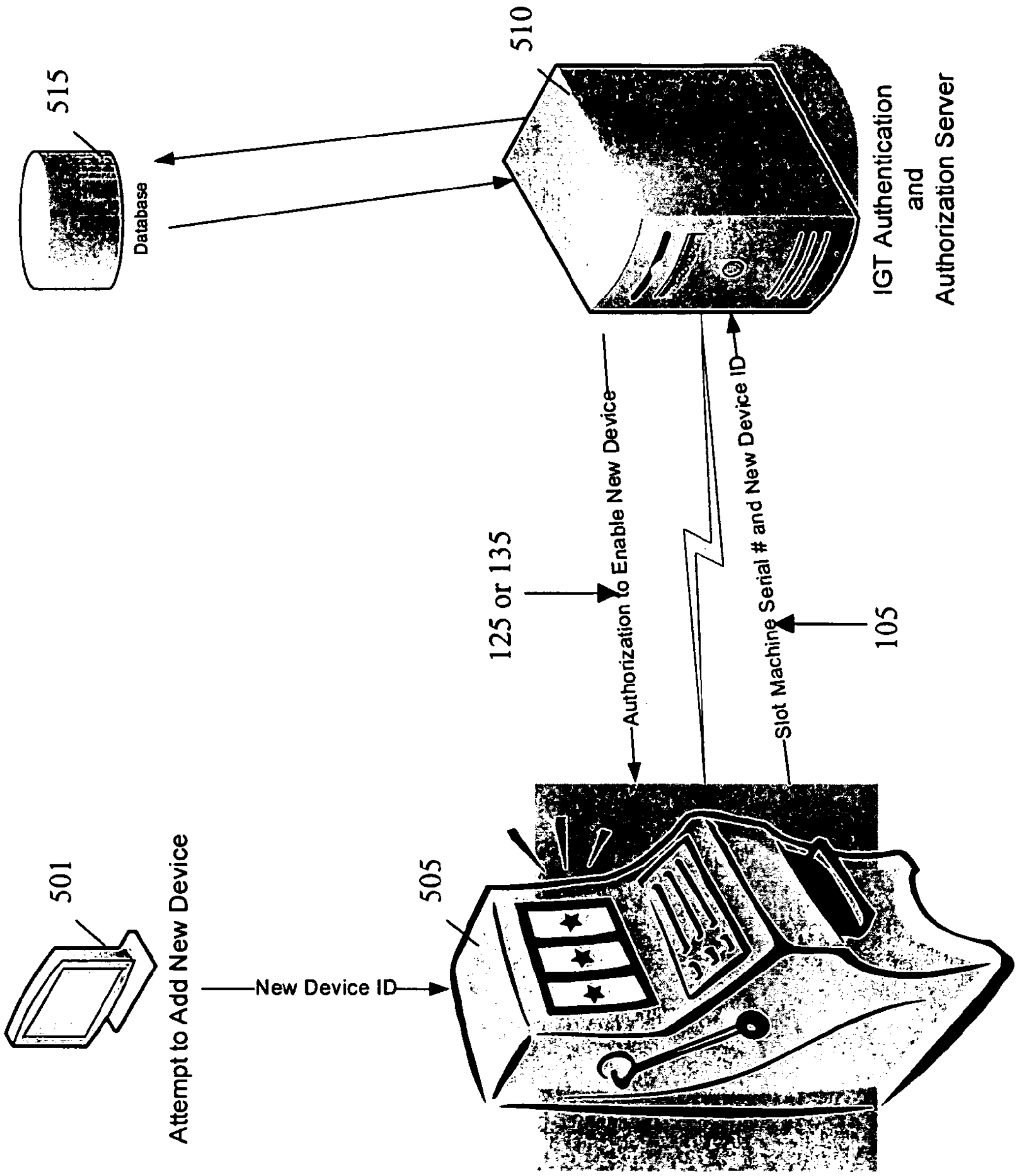
FIG. 5 illustrates communications between a wager gaming machine and a server according to some implementations of the invention.

FIG. 5 is a very simplified network diagram that illustrates some of the above-described methods and devices. When new peripheral device 501 is configured for communication with wager gaming machine 505 (a slot machine in this example), gaming machine 505 obtains peripheral identification data from peripheral device 501. Gaming machine 505 transmits these peripheral identification data, along with gaming machine identification data, to authentication/authorization server 510. This process may be similar to that of step 105, described above with reference to FIG. 1.

In this example, authentication/authorization server 510 performs steps described above with reference to FIGS. 1 and 4. In so doing, authentication/authorization server 510 retrieves information from one or more storage devices 515. Storage devices 515 may be integrated into authentication/authorization server 510 or may be separate devices. It will be appreciated that more than one of each type of device may be involved in the evaluation process. For example, there may be separate servers, host devices, etc., dedicated to authentication, location/jurisdiction determination and authorization processes. Moreover, there may be multiple storage devices involved.

In this example, it is determined that new peripheral device 501 may be used with wager gaming machine 505 in the jurisdiction within which wager gaming machine 505 is located. Therefore, authentication/authorization server 510 sends an authorization to enable the wager gaming machine to function with new peripheral device 501. The authorization may or may not include relevant code, as described above with reference to steps 125 and 135 of method 100.

Some gaming networks described herein allow for the convenient provisioning of networked gaming machines and allow additional game themes to be easily and conveniently added or changed, if desired. Related software, including but not limited to game software and peripheral software, may be downloaded to networked gaming machines. Some such networks provide methods and devices for managing one or more networked gaming establishments. Such networks may sometimes be referred to herein as server-based gaming networks, sb networks, or the like.

Relevant information is set forth in U.S. patent application Ser. No. 11/225,407, by Wolf et al., entitled "METHODS AND DEVICES FOR MANAGING GAMING NETWORKS" and filed Sep. 12, 2005, in U.S. patent application Ser. No. 10/757,609 by Nelson et al., entitled "METHODS AND APPARATUS FOR GAMING DATA DOWNLOADING" and filed on Jan. 14, 2004, in U.S. patent application Ser. No. 10/938,293 by Benbrahim et al., entitled "METHODS AND APPARATUS FOR DATA COMMUNICATION IN A GAMING SYSTEM" and filed on Sep. 10, 2004, in U.S. patent application Ser. No. 11/225,337 by Nguyen et al., filed Sep. 12, 2005 and entitled "DISTRIBUTED GAME SERVICES" and in U.S. patent application Ser. No. 11/173,442 by Kinsley et al., filed Jul. 1, 2005 and entitled "METHODS AND DEVICES FOR DOWNLOADING GAMES OF CHANCE," all of which are hereby incorporated by reference in their entirety and for all purposes.

Figure 6:
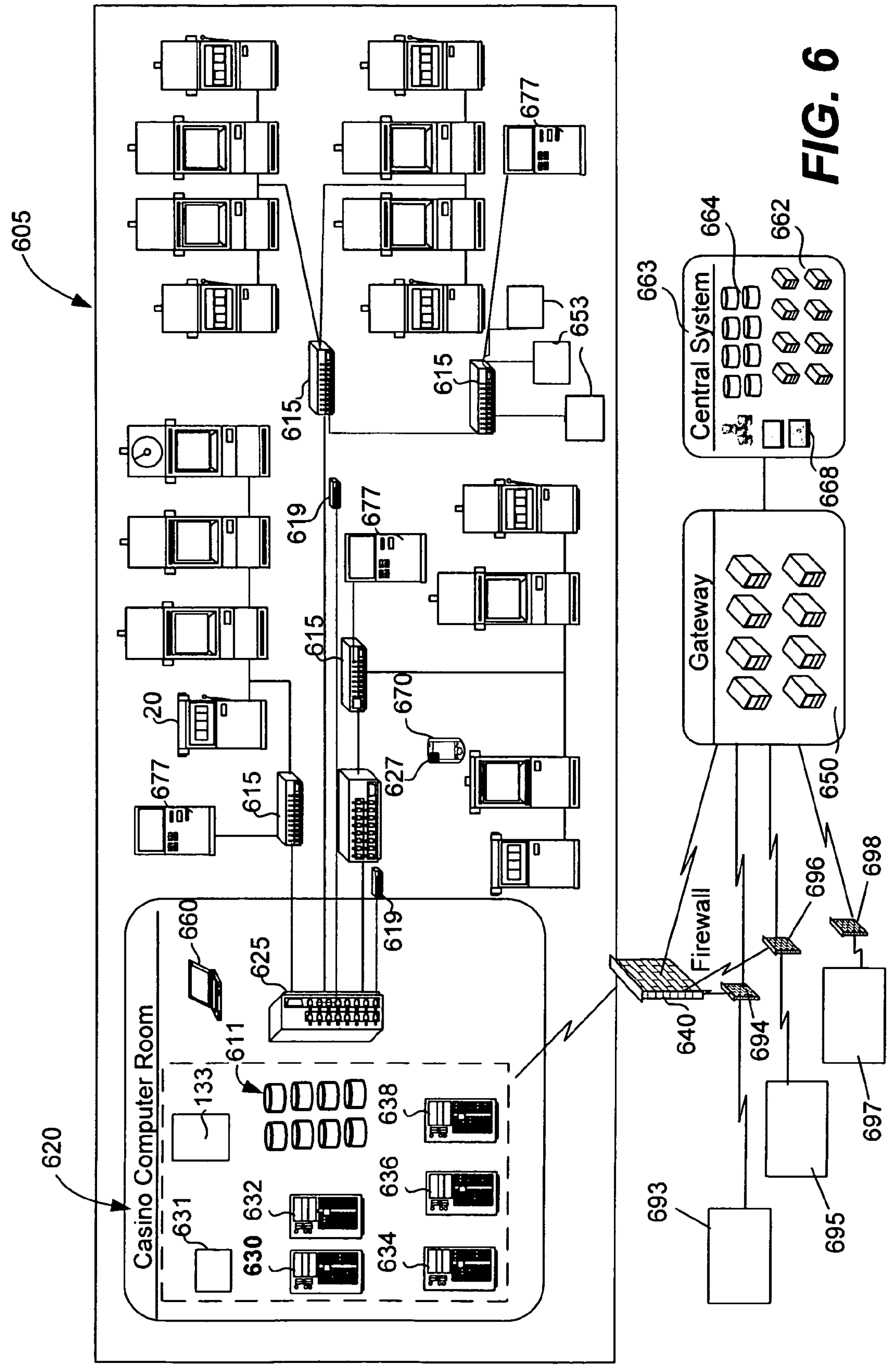
FIG. 6 is a network diagram illustrating networked gaming establishments and associated devices that may be configured in accordance with the present invention.

One example of a gaming network and related devices is depicted in FIG. 6. Those of skill in the art will realize that this architecture and the related functionality are merely examples and that the present invention encompasses many other such embodiments and methods. Here, casino computer room 620 and networked devices of a single gaming establishment 605 are illustrated. In some implementations, other gaming establishments are also in communication with at least some devices of casino computer room 620: in this example, gaming establishments 693 and 695 are configured for communication with casino computer room 620. Gaming establishment 697 is not in communication with other gaming establishments, but is configured for communication with central system 663 via gateway 650. Some gaming establishments (not shown) may not be in communication with other gaming establishments or with a central system.

Gaming establishment 605 includes multiple gaming machines 20, each of which is part of a bank 610 of gaming machines 20. In this example, gaming establishment 605 also includes a bank of networked gaming tables 653. It will be appreciated that many gaming establishments include hundreds or even thousands of gaming machines 20 and/or gaming tables 653, not all of which are included in a bank. However, the present invention may be implemented in gaming establishments having any number of gaming machines, gaming tables, etc.

Gaming establishment 605 also includes networked kiosks 677. Depending on the implementation, kiosks 677 may be used for various purposes, including but not limited to cashing out, prize redemption, redeeming points from a player loyalty program, redeeming "cashless" indicia such as bonus tickets, smart cards, etc. In some implementations, kiosks 677 may be used for obtaining information about the gaming establishment, e.g., regarding scheduled events (such as tournaments, entertainment, etc.), regarding a patron's location, etc.

In this example, each bank 610 has a corresponding switch 615, which may be a conventional bank switch in some implementations. Each switch 615 is configured for communication with one or more devices in computer room 620 via main network device 625, which combines switching and routing functionality in this example. Although various floor communication protocols may be used, some preferred implementations use IGT's open, Ethernet-based SuperSAS® protocol, which IGT makes available for downloading without charge. However, other protocols such as Best of Breed ("BOB"), Game to System ("G2S"), etc., may be used to implement various aspects of the invention. IGT has also developed a gaming-industry-specific transport layer called CASH that rides on top of TCP/IP and offers additional functionality and security.

Here, gaming establishment 605 also includes an RFID network, implemented in part by RFID switches 619 and multiple RFID readers (not shown). An RFID network may be used, for example, to track objects (such as mobile gaming devices), patrons, etc., in the vicinity of gaming establishment 605. Some examples of how an RFID network may be used in a gaming establishment are set forth in U.S. patent application Ser. No. 11/599,241, entitled "DOWNLOADING UPON THE OCCURRENCE OF PREDETERMINED EVENTS" and filed on Nov. 13, 2006, which is hereby incorporated by reference.

In this example, mobile device 670 includes RFID tag 627, which includes encoded identification information for mobile device 670. Accordingly, the location mobile device 670 in gaming establishment 605 may be tracked via the RFID network. Other location-detection devices and systems, such as the global positioning system ("GPS"), may be used to monitor the location of devices in the vicinity of gaming establishment 605 or elsewhere.

Various alternative network topologies can be used to implement different aspects of the invention and/or to accommodate varying numbers of networked devices. For example, gaming establishments with large numbers of gaming machines 20 may require multiple instances of some network devices (e.g., of main network device 625, which combines switching and routing functionality in this example) and/or the inclusion of other network devices not shown in FIG. 6. For example, some implementations of the invention include one or more middleware servers disposed between kiosks 677, RFID switches 619 and/or bank switches 615 and one or more devices in computer room 620 (e.g., a corresponding server). Such middleware servers can provide various useful functions, including but not limited to the filtering and/or aggregation of data received from switches, from individual gaming machines and from other player terminals. Some implementations of the invention include load-balancing methods and devices for managing network traffic.

Storage devices 611, sb™ server 630, License Manager 631, Arbiter 133, servers 632, 634, 636 and 638, host device(s) 660 and main network device 625 are disposed within computer room 620 of gaming establishment 605. In practice, more or fewer devices may be used. Depending on the implementation, some such devices may reside in gaming establishment 605 or elsewhere. Some of these servers may be configured to perform tasks relating to accounting, player loyalty, bonusing/progressives, configuration of gaming machines, etc. One or more such devices may b used to implement a casino management system, such as the IGT Advantage™ Casino System suite of applications, which provides instantaneous information that may be used for decision-making by casino managers. Preferably, a Radius server and a DHCP server are also configured for communication with the gaming network. Some implementations of the invention provide one or more of these servers in the form of blade servers.

Some servers, host devices and/or other devices in central system 663 and/or gaming establishment 605, including those in computer room 620, may be configured to perform tasks specific to the present invention. For example, one or more servers 662, storage devices 664 and/or host devices 668 of central system 663 may be configured to perform the authentication and authorization functions described elsewhere herein. One or more devices in gaming establishment 605 may provide location information that will be included with gaming machine and peripheral device data that is sent to central system 663. In some implementations of the invention, one or more servers 662 or host devices 668 may reference one or more databases (e.g., ajurisdictional database, a gaming machine database, etc.), to obtain information for making some determinations described herein. One or more servers 662 or host devices 668 may reference one or more databases of peripheral software, gaming software, etc., to be evaluated and/or provided to authorized gaming machines. Such databases may reside on one or more of storage devices 664 (or elsewhere).

License Manager 631 may also be implemented, at least in part, via a server or a similar device. Some exemplary operations of License Manager 631 are described in detail in U.S. patent application Ser. No. 11/225,408, entitled "METHODS AND DEVICES FOR AUTHENTICATION AND LICENSING IN A GAMING NETWORK" by Kinsley et al., which is hereby incorporated by reference.

Some preferred embodiments of sb™ server S30 and the other servers shown in FIG. 6 include (or are at least in communication with) clustered CPUs, redundant storage devices, including backup storage devices, switches, etc. Such storage devices may include a "RAID" (originally redundant array of inexpensive disks, now also known as redundant array of independent disks) array, back-up hard drives and/or tape drives, etc.

In some implementations of the invention, many of these devices (including but not limited to License Manager 631, servers 632, 634, 636 and 638, and main network device 625) are mounted in a single rack with sb™ server 630. Accordingly, many or all such devices will sometimes be referenced in the aggregate as an "sb™ server." However, in alternative implementations, one or more of these devices is in communication with sb™ server 630 and/or other devices of the network but located elsewhere. For example, some of the devices could be mounted in separate racks within computer room 620 or located elsewhere on the network. Moreover, it can be advantageous to store large volumes of data elsewhere via a storage area network ("SAN").

Computer room 620 may include one or more operator consoles or other host devices that are configured for communication with other devices within and outside of computer room 620. Such host devices may be provided with software, hardware and/or firmware for implementing various aspects of the invention. However, such host devices need not be located within computer room 620. Wired host device 660 (which is a laptop computer in this example) and wireless device 670 (which is a PDA in this example) may be located elsewhere in gaming establishment 605 or at a remote location. Here, wireless device 670 is configured for network management tasks, but wireless devices 670 may also be configured as mobile gaming devices.

Arbiter 133 may be implemented, for example, via software that is running on a server or another networked device. Arbiter 133 serves as an intermediary between different devices on the network. Some implementations of Arbiter 133 are described in U.S. patent application Ser. No. 10/948,387, entitled "METHODS AND APPARATUS FOR NEGOTIATING COMMUNICATIONS WITHIN A GAMING NETWORK" and filed Sep. 23, 2004 (the "Arbiter Application"), which is incorporated herein by reference and for all purposes. In some preferred implementations, Arbiter 133 is a repository for the configuration information required for communication between devices on the gaming network (and, in some implementations, devices outside the gaming network). Although Arbiter 133 can be implemented in various ways, one exemplary implementation is discussed in the following paragraphs.

Figure 7:
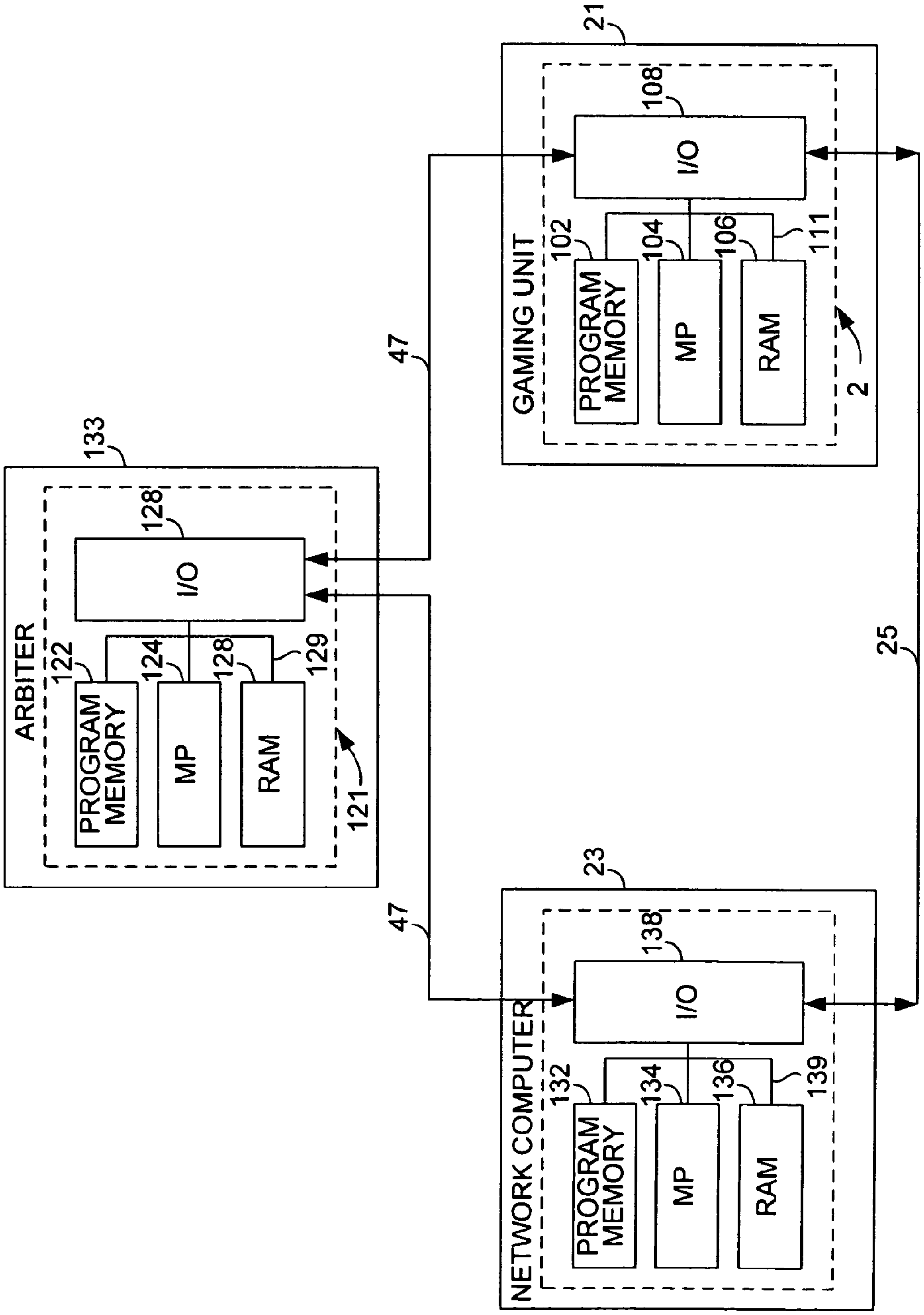
FIG. 7 is a block diagram illustrating a networked Arbiter, gaming machine and network device.

FIG. 7 is a block diagram of a simplified communication topology between gaming unit 20, network computer 23 and Arbiter 133. Network computer 23 may be, for example, a server or other device within computer room 620 or elsewhere. Although only one gaming unit 20, one network computer 23 and one Arbiter 133 are shown in FIG. 7, it should be understood that the following examples may be applicable to different types of networked devices in addition to gaming unit 20 and network computer 23, and may include different numbers of network computers, gaming security arbiters and gaming units. For example, a single Arbiter 133 may be used for secure communications among a plurality of network computers 23 and tens, hundreds or thousands of gaming units 20. Likewise, multiple gaming security arbiters 46 may be utilized for improved performance and other scalability factors.

Referring to FIG. 7, the Arbiter 133 may include an arbiter controller 121 that may comprise a program memory 122, a microcontroller or microprocessor (MP) 124, a random-access memory (RAM) 126 and an input/output (I/O) circuit 128, all of which may be interconnected via an address/data bus 129. The network computer 23 may also include a controller 131 that may comprise a program memory 132, a microcontroller or microprocessor (MP) 134, a random-access memory (RAM) 136 and an input/output (I/O) circuit 138, all of which may be interconnected via an address/data bus 139. It should be appreciated that although the Arbiter 133 and the network computer 23 are each shown with only one microprocessor 124, 134, the controllers 121, 131 may each include multiple microprocessors 124, 134. Similarly, the memory of the controllers 121, 131 may include multiple RAMs 126, 136 and multiple program memories 122, 132. Although the I/O circuits 128, 138 are each shown as a single block, it should be appreciated that the I/O circuits 128, 138 may include a number of different types of I/O circuits. The RAMs 124, 134 and program memories 122, 132 may be implemented as semiconductor memories, magnetically readable memories, and/or optically readable memories, for example.

Although the program memories 122, 132 are shown in FIG. 4C as read-only memories (ROM) 122, 132, the program memories of the controllers 121, 131 may be a read/write or alterable memory, such as a hard disk. In the event a hard disk is used as a program memory, the address/data buses 129, 139 shown schematically in FIG. 7 may each comprise multiple address/data buses, which may be of different types, and there may be an I/O circuit disposed between the address/data buses.

As shown in FIG. 7, the gaming unit 20 may be operatively coupled to the network computer 23 via the data link 25. The gaming unit 20 may also be operatively coupled to the Arbiter 133 via the data link 49, and the network computer 23 may likewise be operatively coupled to the Arbiter 133 via the data link 47. Communications between the gaming unit 20 and the network computer 23 may involve different information types of varying levels of sensitivity resulting in varying levels of encryption techniques depending on the sensitivity of the information. For example, communications such as drink orders and statistical information may be considered less sensitive. A drink order or statistical information may remain encrypted, although with moderately secure encryption techniques, such as RC4, resulting in less processing power and less time for encryption. On the other hand, financial information (e.g., account information, winnings, etc.), download information (e.g., game and/or peripheral software, licensing information, etc.) and personal information (e.g., social security number, personal preferences, etc.) may be encrypted with stronger encryption techniques such as DES or 3DES to provide increased security.

As disclosed in further detail in the Arbiter Application, the Arbiter 133 may verify the authenticity of each network gaming device. The Arbiter 133 may receive a request for a communication session from a network device. For ease of explanation, the requesting network device may be referred to as the client, and the requested network device may be referred to as the host. The client may be any device on the network and the request may be for a communication session with any other network device. The client may specify the host, or the gaming security arbiter may select the host based on the request and based on information about the client and potential hosts. The Arbiter 133 may provide encryption keys (session keys) for the communication session to the client via the secure communication channel. Either the host and/or the session key may be provided in response to the request, or may have been previously provided. The client may contact the host to initiate the communication session. The host may then contact the Arbiter 133 to determine the authenticity of the client. The Arbiter 133 may provide affirmation (or lack thereof) of the authenticity of the client to the host and provide a corresponding session key, in response to which the network devices may initiate the communication session directly with each other using the session keys to encrypt and decrypt messages.

Alternatively, upon receiving a request for a communication session, the Arbiter 133 may contact the host regarding the request and provide corresponding session keys to both the client and the host. The Arbiter 133 may then initiate either the client or the host to begin their communication session. In turn, the client and host may begin the communication session directly with each other using the session keys to encrypt and decrypt messages. An additional explanation of the communication request, communication response and key distribution is provided in the Arbiter Application.

If a host device is located in a remote location, security methods and devices (such as firewalls, authentication and/or encryption) should be deployed in order to prevent the unauthorized access of the gaming network. Similarly, any other connection between gaming network 605 and the outside world should only be made with trusted devices via a secure link, e.g., via a virtual private network ("VPN") tunnel. For example, the illustrated connection between sb™ server 630, gateway 650 and central system 663 (that may be used for communications involving peripheral device software downloads, etc.) is advantageously made via a VPN tunnel. Details of VPN methods that may be used with the present invention are described in the reference, "Virtual Private Networks-Technologies and Solutions," by R. Yueh and T. Strayer, Addison-Wesley, 2001, ISBN#0-201-70209-6, which is incorporated herein by reference and for all purposes. Additionally VPNs may be implemented using a variety of protocols, such as, for example, IP Security (IPSec) Protocol, Layer 2 Tunneling Protocol, Multiprotocol Label Switching (MPLS) Protocol, etc. Details of these protocols, including RFC reports, may be obtained from the VPN Consortium, an industry trade group (http://www.vpnc.com, VPNC, Santa Cruz, Calif.).

For security purposes, any information transmitted to or from a gaming establishment over a public network may be encrypted. In one implementation, the information may be symmetrically encrypted using a symmetric encryption key, where the symmetric encryption key is asymmetrically encrypted using a private key. The public key may be obtained from a remote public key server. The encryption algorithm may reside in processor logic stored on the gaming machine. When a remote server receives a message containing the encrypted data, the symmetric encryption key is decrypted with a private key residing on the remote server and the symmetrically encrypted information sent from the gaming machine is decrypted using the symmetric encryption key. A different symmetric encryption key is used for each transaction where the key is randomly generated. Symmetric encryption and decryption is preferably applied to most information because symmetric encryption algorithms tend to be 100-10,000 faster than asymmetric encryption algorithms.

As mentioned elsewhere herein, U.S. patent application Ser. No. 11/225,408, entitled "METHODS AND DEVICES FOR AUTHENTICATION AND LICENSING IN A GAMING NETWORK" by Kinsley et al., describes novel methods and devices for authentication, downloading and license management. This application has been incorporated herein by reference.

Providing a secure connection between the local devices of the gaming network 605 and central system 663 allows for the deployment of many advantageous features. For example, a customer (e.g., an employee of a gaming establishment) can log onto an account of central system 663 to obtain the account information such as the customer's current and prior account status. Automatic updates of a customer's software may also be enabled. For example, central system 663 may notify one or more devices in gaming establishment 605 regarding new products and/or product updates. For example, central system 663 may notify server (or other device) in computer room 620 regarding new software, software updates, the status of current software licenses, etc. Alternatively, such updates could be automatically provided to a server in computer room 620 and downloaded to networked gaming machines.

After the local server receives this information, relevant products of interest may be identified (by the server, by another device or by a human being). If an update or a new software product is desired, it can be downloaded from the central system. Similarly, a customer may choose to renew a software license via a secure connection with central system 463, e.g., in response to a notification that the software license is required.

In addition, providing secure connections between different gaming establishments can enable alternative implementations of the invention. For example, a number of gaming establishments may be owned and/or controlled by the same entity. In such situations, having secure communications between gaming establishments makes it possible for a gaming entity to use one or more servers in a gaming establishment as an interface between central system 663 and gaming machines in multiple gaming establishments. For example, new or updated peripheral device software may be obtained by a server in one gaming establishment and distributed to gaming machines in that gaming establishment and/or other gaming establishments.

Figure 8:
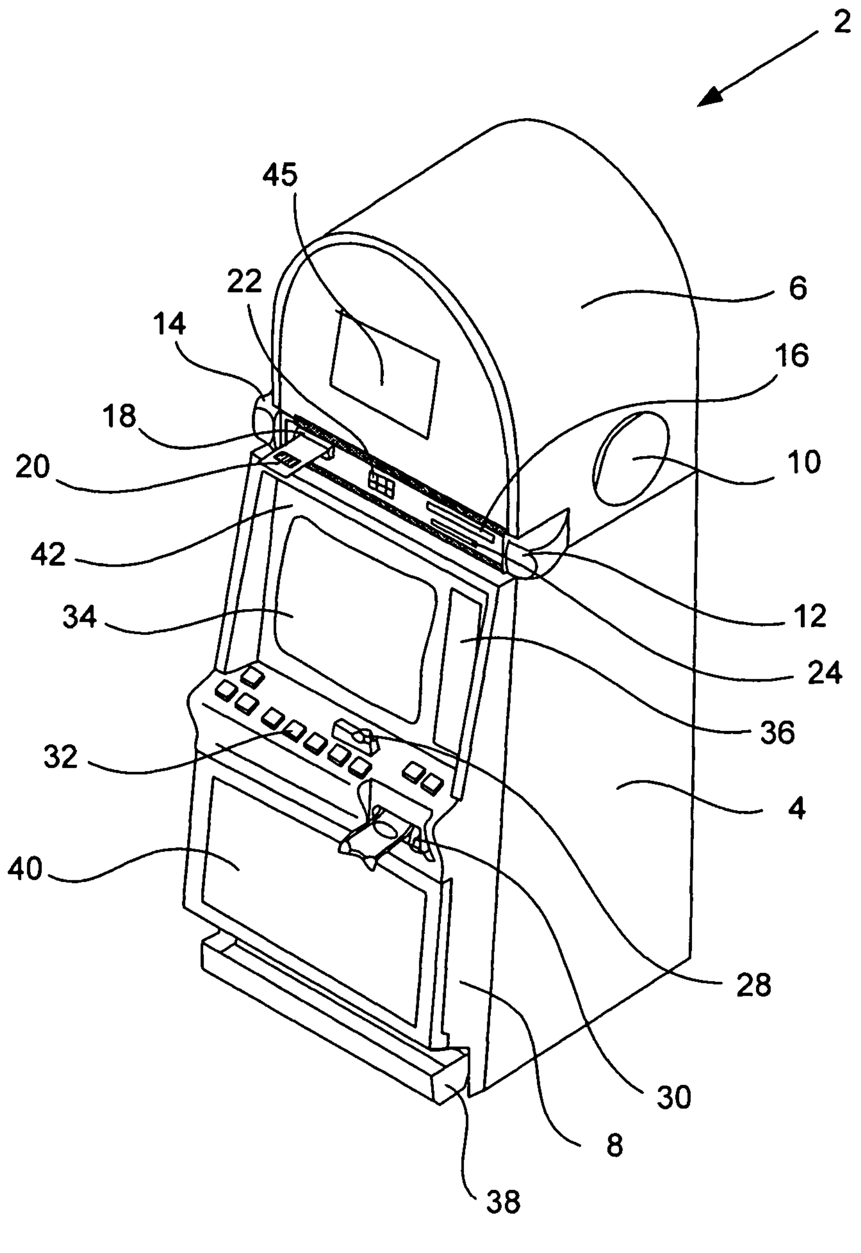
FIG. 8 is a diagram of a gaming machine that may be configured in accordance with the present invention.

Turning next to FIG. 8, a video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2. The devices are controlled by circuitry (e.g. the master gaming controller) housed inside the main cabinet 4 of the machine 2.

Many different types of games, including mechanical slot games, video slot games, video poker, video black jack, video pachinko and lottery, may be provided with gaming machines of this invention. In particular, the gaming machine 2 may be operable to provide a play of many different instances of games of chance. The instances may be differentiated according to themes, sounds, graphics, type of game (e.g., slot game vs. card game), denomination, number of paylines, maximum jackpot, progressive or non-progressive, bonus games, etc. The gaming machine 2 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine 2 may be stored as game software on a mass storage device in the gaming machine or may be generated on a remote gaming device but then displayed on the gaming machine. The gaming machine 2 may executed game software, such as but not limited to video streaming software that allows the game to be displayed on the gaming machine. When an instance is stored on the gaming machine 2, it may be loaded from the mass storage device into a RAM for execution. In some cases, after a selection of an instance, the game software that allows the selected instance to be generated may be downloaded from a remote gaming device, such as another gaming machine.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 42. The ticket printer 18 may be used to print tickets for a cashless ticketing system. Further, the top box 6 may house different or additional devices than shown in FIG. 8. For example, the top box may contain a bonus wheel or a back-lit silk screened panel which may be used to add bonus features to the game being played on the gaming machine. As another example, the top box may contain a display for a progressive jackpot offered on the gaming machine. During a game, these devices are controlled and powered, in part, by circuitry (e.g. a master gaming controller) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described below, can be deployed on most any gaming machine now available or hereafter developed.

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in IGT gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfumction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT slot machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed is stored. This feature allows the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion.

Another feature of gaming machines, such as IGT gaming computers, is that they often contain unique interfaces, including serial interfaces, to connect to specific subsystems internal and external to the slot machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives. A few details related to trusted memory devices that may be used in the present invention are described in U.S. Pat. No. 6,685,567 from U.S. patent application Ser. No. 09/925,098, filed Aug. 8, 2001 and titled "Process Verification," which is incorporated herein in its entirety and for all purposes.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Returning to the example of FIG. 8, when a user wishes to play the gaming machine 2, he or she inserts cash through the coin acceptor 28 or bill validator 30. Additionally, the bill validator may accept a printed ticket voucher which may be accepted by the bill validator 30 as an indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 42 located in the top box.

During the course of a game, a player may be required to make a number of decisions, which affect the outcome of the game. For example, a player may vary his or her wager on a particular game, select a prize for a particular game selected from a prize server, or make game decisions that affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

It will be understood that the above-described arrangements of devices and the methods therefrom are merely illustrative of applications of the principles of this invention and many other embodiments and modifications may be made without departing from the spirit and scope of the invention as defined in the claims.

I claim:

1. A wager gaming machine, comprising:

a network interface;

a plurality of interfaces for communication with peripheral devices of the wager gaming machine, the peripheral devices including:

(a) an acceptor of a first physical item associated with a first monetary value, and (b) a validator configured to identify the first physical item;

a memory containing a database of peripheral data, the peripheral data comprising data identifying a plurality of peripherals and data indicating each peripheral in the plurality of peripherals approved for use within a given jurisdiction and with a given game; and at least one processor configured for communication with the plurality of interfaces, the network interface and the memory, the at least one processor configured to:

determine that a previously-installed peripheral device has been replaced with a replacement peripheral device, wherein the replacement peripheral device has been installed in or communicatively connected with the wager gaming machine;

determine whether at least one game is approved for use with the replacement peripheral device installed in or communicatively connected with the wager gaming machine;

send wager gaming machine identification data and peripheral device data for the wager gaming machine to a device via the network interface;

receive a response from the device, wherein the response includes peripheral device code relating to the replacement peripheral device, the peripheral device code includes emulation code to facilitate the use of the replacement peripheral device with a legacy game offered for play on the wager gaming machine; and determine, based at least in part on the response or the determinations, whether to enable operation of the wager gaming machine.

2. The wager gaming machine of claim 1, wherein at least one processor is configured to perform the sending step after the wager gaming machine has performed, at least in part, an initialization process.

3. The wager gaming machine of claim 1, wherein at least one processor is configured to perform the sending step after ascertaining that no previous response has been received authorizing the operation of at least one peripheral device currently installed in or communicatively connected with the wager gaming machine.

4. The wager gaming machine of claim 1, wherein the device is a central server.

5. The wager gaming machine of claim 1, wherein at least one processor is further configured to send location data to the device.

6. The wager gaming machine of claim 1, wherein the peripheral device data indicate at least one peripheral device that is currently installed in or communicatively connected with the wager gaming machine.

7. The wager gaming machine of claim 6, wherein the database indicates at least one peripheral device that is not currently configured for communication with the wager gaming machine.

8. The wager gaming machine of claim 1, wherein the peripheral device data indicate all peripheral devices that are currently installed in or communicatively connected with the wager gaming machine.

9. The wager gaming machine of claim 1, wherein at least one processor is further configured to determine at least some of the peripheral device data by polling peripheral devices currently installed in or communicatively connected with the wager gaming machine.

10. The wager gaming machine of claim 1, wherein the peripheral device data comprise at least one of a peripheral device model number and a peripheral device serial number.

11. The wager gaming machine of claim 1, wherein at least one processor is further configured to update the database when the response indicates an approval of the replacement peripheral device.

12. The wager gaming machine of claim 1, wherein the peripheral device data comprise data regarding the replacement peripheral device.

13. The wager gaming machine of claim 1, wherein the peripheral device code includes driver software for the replacement peripheral device.

14. The wager gaming machine of claim 1, wherein the peripheral data comprising data identifying a plurality of peripherals includes data identifying two or more peripherals of the same type.

15. The wager gaming machine of claim 1, wherein the at least one processor is further configured to:

determine that a new peripheral device has been installed in or communicatively connected with the wager gaming machine, wherein the new peripheral device does not replace an existing peripheral device of the wager gaming machine;

determine whether peripheral device code is available locally for the new peripheral device;

determine whether at least one game is approved for use with the new peripheral device installed in or communicatively connected with the wager gaming machine;

send wager gaming machine identification data and peripheral device data for the wager gaming machine to a device via the network interface;

receive a response from the device; and determine, based at least in part on the response or the determinations, whether to enable operation of the wager gaming machine.

16. A method, comprising:

determining whether a previously-installed peripheral device has been replaced with a replacement peripheral device, wherein the replacement peripheral device has been installed in or communicatively connected with a wager gaming machine;

determining whether at least one game is approved in a given jurisdiction for the replacement peripheral device installed in or communicatively connected with the wager gaming machine;

sending wager gaming machine identification data and peripheral device data for the wager gaming machine to a central server;

receiving a response from the central server, wherein the response includes peripheral device code relating to the replacement peripheral device, the peripheral device code includes emulation code to facilitate the use of the replacement peripheral device with a legacy game offered for play on the wager gaming machine;

determining whether to enable operation of the wager gaming machine according to the response or the determinations; and if it is determined to enable operation of the wager gaming machine, receiving, via an acceptor, a first physical item associated with a first monetary value and identifying, via a validator, the first physical item.

17. The method of claim 16, wherein the sending step further comprises sending location data to the central server.

18. The method of claim 16, wherein the peripheral device data indicate peripheral devices currently configured for communication with the wager gaming machine.

19. The method of claim 16, wherein the sending step is performed after receiving an indication that the replacement peripheral device has been installed in or communicatively connected with the wager gaming machine.

20. The method of claim 16, wherein the sending step is performed after the wager gaming machine has performed, at least in part, an initialization process.

21. The method of claim 16, wherein the sending step is performed after ascertaining that no previous response has been received authorizing the operation of at least one peripheral device currently installed in or communicatively connected with the wager gaming machine.

22. The method of claim 16, further comprising determining at least some of the peripheral device data from a database of approved peripheral devices that are approved for use with the wager gaming machine in at least one jurisdiction.

23. The method of claim 22, wherein the approved peripheral devices comprise authorized peripheral devices that are currently authorized for use and unauthorized peripheral devices that are not currently authorized for use.

24. The method of claim 16, further comprising determining at least some of the peripheral device data from a peripheral device installed in or communicatively connected with the wager gaming machine.

25. The method of claim 16, wherein the sending step comprises sending data from the wager gaming machine to the central server.

26. The method of claim 16, wherein the sending step comprises sending data from a host device to the central server.

27. The method of claim 16, wherein the sending step comprises sending data from a network device to the central server.

28. The method of claim 27, wherein the network device is a bank switch.

29. The method of claim 16, wherein the peripheral device data comprise at least one of a peripheral device model number and a peripheral device serial number.

30. The method of claim 16, further comprising:

determining whether a new peripheral device has been installed in or communicatively connected with a wager gaming machine, wherein the new peripheral device does not replace an existing peripheral device of the wager gaming machine;

determining whether peripheral device code is available locally for the new peripheral device installed in or communicatively connected with the wager gaming machine;

determining whether at least one game is approved in a given jurisdiction for the new peripheral device installed in or communicatively connected with the wager gaming machine;

sending wager gaming machine identification data and peripheral device data for the wager gaming machine to a central server;

receiving a response from the central server; and determining whether to enable operation of the wager gaming machine according to the response or the determinations.

31. A wager gaming machine, comprising:

a plurality of peripheral interfaces for communication with peripheral devices, the peripheral devices including:

(a) an acceptor of a first physical item associated with a first monetary value, and (b) a validator configured to identify the first physical item;

a network interface;

a memory having a data structure stored therein, the data structure comprising peripheral device fields, the peripheral device fields indicating peripheral devices, one or more games that the peripheral devices are approved to operate with, and one or more jurisdictions that the peripheral devices are approved to operate in, the memory providing dynamic allocation of peripheral device fields; and at least one processor configured for communication with the network interface and the plurality of peripheral interfaces, the processor configured to:

identify whether a previously-installed peripheral device has been replaced with a new peripheral device, wherein the replacement peripheral device is installed in or communicatively connected with the wager gaming machine and in communication with a peripheral interface;

ascertain whether the replacement peripheral device is indicated in the data structure;

send an authorization request to a device via the network interface according to whether the replacement peripheral device is indicated in the data structure; and receive a response from the device, wherein the response includes peripheral device code relating to the replacement peripheral device, the peripheral code includes emulation code to facilitate the use of the replacement peripheral device with a legacy game offered for play on the wager gaming machine.

32. The wager gaming machine of claim 31, wherein at least one processor is further configured to send the authorization request to a central server via the network interface when the peripheral device is indicated in the data structure.

33. The wager gaming machine of claim 32, wherein at least one processor is further configured to:

receive a response from the central server; and determine whether to enable operation of the wager gaming machine according to the response.

34. The wager gaming machine of claim 31, wherein at least one processor is further configured to prevent wager gaming on the wager gaming machine based on information regarding the replacement peripheral device indicated in the data structure.

35. The wager gaming machine of claim 31, wherein at least one processor is further configured to:

determine a jurisdiction of the wager gaming machine;

determine, by reference to the data structure, whether the replacement peripheral device is authorized for use with the wager gaming machine in the jurisdiction; and send the authorization request only when it is determined that the replacement peripheral device is authorized for use with the wager gaming machine in the jurisdiction.

36. The wager gaming machine of claim 31, wherein the at least one processor is further configured to:

identify that a new peripheral device is installed in or communicatively connected with the wager gaming machine and in communication with a peripheral interface;

ascertain whether the new peripheral device is indicated in the data structure; and determine whether to send an authorization request via the network interface according to whether the new peripheral device is indicated in the data structure.

* * * * *